US011519822B2

(12) United States Patent
Anzawa

(10) Patent No.: US 11,519,822 B2
(45) Date of Patent: Dec. 6, 2022

(54) MISFIRE DETECTION DEVICE AND METHOD FOR INTERNAL COMBUSTION ENGINE

(71) Applicant: TOYOTA JIDOSHA KABUSHIKI KAISHA, Toyota (JP)

(72) Inventor: Takumi Anzawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/482,847

(22) Filed: Sep. 23, 2021

(65) Prior Publication Data

US 2022/0099529 A1 Mar. 31, 2022

(30) Foreign Application Priority Data

Sep. 29, 2020 (JP) .............................. JP2020-162969

(51) Int. Cl.
*F02D 41/00* (2006.01)
*G01M 15/05* (2006.01)
(52) U.S. Cl.
CPC ........... *G01M 15/05* (2013.01); *F02D 41/008* (2013.01); *F02D 41/009* (2013.01); *F02D 2200/101* (2013.01)
(58) Field of Classification Search
CPC .... F02D 41/00; F02D 41/008; F02D 41/0085; F02D 41/0087; F02D 41/009; F02D 41/029; F02D 41/14; F02D 41/1475; F02D 41/1498; F02D 2200/101; G01M 15/05; G01M 15/11
See application file for complete search history.

(56) References Cited

U.S. PATENT DOCUMENTS

| 5,309,756 | A | | 5/1994 | Osawa et al. |
| 5,633,456 | A | * | 5/1997 | Stander ................. G01M 15/11 123/436 |
| 2009/0049895 | A1 | | 2/2009 | Huber et al. |

(Continued)

FOREIGN PATENT DOCUMENTS

| JP | 5-60004 A | 3/1993 |
| JP | 2007-69860 A | 3/2007 |

*Primary Examiner* — John Kwon
*Assistant Examiner* — Johnny H Hoang
(74) *Attorney, Agent, or Firm* — Oblon, McClelland, Maier & Neustadt, L.L.P.

(57) ABSTRACT

A misfire detection device executes a deactivating process that deactivates combustion control for air-fuel mixture in one or some of cylinders and a deactivating process that determines whether a misfire has occurred. The determining process determines whether a misfire has occurred by evaluating a magnitude of a rotation fluctuation amount using a determination value independent from the rotation fluctuation amount. The determining process includes a deactivation-related setting process that sets a different determination value for each of first and second cylinders when the deactivating process is executed. The deactivating process has not been executed in the first and second cylinders. The rotation fluctuation amount is a change amount of an instantaneous speed variable. The instantaneous speed variable indicates a speed in a case in which a crankshaft rotates in a rotation angle region that is less than or equal to an occurrence interval of a compression top dead center.

8 Claims, 5 Drawing Sheets

(56) References Cited

U.S. PATENT DOCUMENTS

| | | | |
|---|---|---|---|
| 2010/0031736 A1* | 2/2010 | Kushihama | G01M 15/11 |
| | | | 73/114.04 |
| 2013/0312504 A1 | 11/2013 | Bowman et al. | |
| 2014/0261317 A1 | 9/2014 | Loucks et al. | |
| 2017/0370804 A1 | 12/2017 | Chen et al. | |
| 2019/0234323 A1 | 8/2019 | Weber et al. | |
| 2020/0263624 A1* | 8/2020 | Muto | F02D 41/2438 |
| 2020/0309055 A1* | 10/2020 | Anzawa | F02D 41/30 |

* cited by examiner

MISFIRE DETECTION DEVICE AND METHOD FOR INTERNAL COMBUSTION ENGINE

FIELD

The present disclosure relates to a misfire detection device and method for an internal combustion engine.

DESCRIPTION OF RELATED ART

Japanese Laid-Open Patent Publication No. 5-060004 discloses an example of a device that determines that a misfire has occurred in an internal combustion engine when a rotation fluctuation amount of the internal combustion engine is greater than or equal to a specific value. The rotation fluctuation amount is quantified using the difference between cylinders in the rotation speed of the crankshaft in a short timescale with a combustion stroke. When combustion control is deactivated in one or some of the cylinders of the internal combustion engine, the device invalidates the determination of whether a misfire has occurred in a cylinder where combustion control is executed.

When combustion control is deactivated in one or some of the cylinders, the occurrence of a misfire in the remaining cylinders may result in, for example, deterioration of exhaust components and thermal degradation of an aftertreatment device for exhaust gas. Thus, even when combustion control is deactivated in one or some of the cylinders, it is desirable to determine whether a misfire has occurred.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspect 1: A misfire detection device for an internal combustion engine is provided. The internal combustion engine includes cylinders. The misfire detection device is configured to execute: a deactivating process that deactivates combustion control for air-fuel mixture in one or some of the cylinders; and a determining process that determines whether a misfire has occurred using a magnitude of a rotation fluctuation amount related to a subject of a determination of whether a misfire has occurred. The determining process determines whether a misfire has occurred by evaluating the magnitude of the rotation fluctuation amount using a determination value independent from the rotation fluctuation amount. The determining process includes a deactivation-related setting process that sets a different determination value for each of a first cylinder and a second cylinder when the deactivating process is executed. The deactivating process has not been executed in the first cylinder and the second cylinder. The rotation fluctuation amount is a change amount of an instantaneous speed variable. The instantaneous speed variable indicates a speed in a case in which a crankshaft rotates in a rotation angle region that is less than or equal to an occurrence interval of a compression top dead center.

The rotation behavior of the crankshaft is different between when the deactivating process is executed and when the deactivating process is not executed. Particularly, when the deactivating process is executed, a remarkable difference tends to occur between the rotation fluctuation amounts obtained when a misfire has not occurred in the cylinders in which combustion control is executed, as compared with when the deactivating process is not executed. In the above-described configuration, a different determination value is set for each of the first cylinder and the second cylinder, in which the combustion control is executed. This allows for a determination of whether a misfire has occurred while reflecting the difference in the rotation fluctuation amount resulting from the deactivating process. Thus, as compared with the same determination value is set, whether a misfire has occurred is determined with higher accuracy.

Aspect 2: In the misfire detection device according to Aspect 1, a compression top dead center of the first cylinder occurs subsequent to a compression top dead center of a cylinder subject to the deactivating process, and a compression top dead center of the second cylinder occurs subsequent to the compression top dead center of the first cylinder.

The deactivating process affects the crankshaft to a greater extent at the point in time that is subsequent to and close to the point in time when the deactivating process is executed than at the point in time that is distant from the point in time when the deactivating process is executed. Thus, in the above-described configuration, at least a different determination value is set for each of two recent cylinders, namely, the first cylinder and the second cylinder, which reach the compression top dead center after the deactivating process. Thus, whether a misfire has occurred in the first cylinder and the second cylinder is determined with high accuracy.

Aspect 3: In the misfire detection device according to Aspect 1 or 2, the deactivation-related setting process includes setting a determination value of the first cylinder and a determination value of the second cylinder to be independent from a determination value in a case in which the deactivating process is not executed.

In the above-described configuration, the determination value of the first cylinder and the determination value of the second cylinder are set independently from the determination value in the case in which the deactivating process is not executed. Thus, for example, in the case of Aspect 2, whether a misfire has occurred is determined with high accuracy even in a case in which the rotation behavior of the crankshaft reflected on the rotation fluctuation amount related to the two recent cylinders (i.e., the first cylinder and the second cylinder), which reach the compression top dead center after the deactivating process, is different from the rotation behavior in a case where the deactivating process is not executed.

Aspect 4: In the misfire detection device according to any one of Aspects 1 to 3, the deactivation-related setting process includes a process that variably sets the determination value using at least one of a load variable or a rotation speed of the crankshaft, the load variable indicating load on the internal combustion engine.

The inertial energy is larger when the rotation speed pf the crankshaft is high than when the rotation speed is low. This limits an increase in the rotation fluctuation despite the fluctuation in torque. The combustion energy in each cylinder is larger when the load is high than when the load is low. This increases the torque variation caused by executing the deactivating process. Thus, the rotation speed and the load are variables that correlate with the magnitude of the rotation fluctuation amount. Accordingly, in the above-described configuration, setting the determination value in correspondence with the rotation speed and the load allows the determination accuracy to be higher than setting the determination value without using the rotation speed and the load.

Aspect 5: In the misfire detection device according to any one of Aspects 1 to 4, the deactivating process includes changing a cylinder subject to deactivation of the combustion control. The deactivation-related setting process includes: a process that sets the determination value to a different value depending on an angular interval between a compression top dead center of a cylinder subject to the determination of misfire and a compression top dead center of a cylinder subject to the deactivating process; and a process that sets the determination value to a different value when the cylinder subject to the determination of misfire is different, even if the angular interval between the compression top dead center of the cylinder subject to the determination of misfire and the compression top dead center of the cylinder subject to the deactivating process is identical.

When the deactivating process is executed, the rotation fluctuation amount in a case where a misfire has not occurred in a cylinder subject to determination tends to differ depending on the angular interval between the compression top dead center of the cylinder subject to determination and the compression top dead center of the cylinder where the deactivating process has been executed. If the angular interval between the compression top dead center of the cylinder subject to determination and the compression top dead center of the cylinder where the deactivating process has been executed is identical but the cylinder subject to determination is different, the rotation fluctuation amount related to the cylinder subject to determination in a case in which a misfire has not occurred may be different. This difference arises from, for example, the difference in geometric arrangement of cylinders.

In the above-described configuration, a different determination value is set in correspondence with the difference in cylinder and the occurrence interval between the compression top dead center of the cylinder where the deactivating process has been executed and the compression top dead center of the cylinder subject to determination. This allows a more appropriate determination value to be set in various situations.

Aspect 6: In the misfire detection device according to any one of Aspects 1 to 5, torque of an electric motor is transmissible to the crankshaft. The misfire detection device is configured to execute a compensation torque operating process that adjusts the torque of the electric motor using a torque command value as an input, a compensation torque being superimposed on the torque command value, the compensation torque compensating for insufficiency of torque in a specific period subsequent to a compression top dead center of the one or some of the cylinders.

In the above-described configuration, when the deactivating process is executed, the compensation torque is output by the electric motor so that the rotation behavior of the crankshaft is affected by the deactivating process and the compensation torque. Thus, as compared with when the rotation behavior of the crankshaft is unaffected by the compensation torque, the rotation behavior of the crankshaft is determined by more complicated factors. Accordingly, setting the determination value common to combustion-control-executed cylinders tends to become difficult. For this reason, the deactivation-related setting process is particularly useful.

Aspect 7: In the misfire detection device according to any one of Aspects 1 to 6, the determining process includes a process that determines whether a misfire has occurred by comparing the determination value with a relative magnitude of a comparison one of the rotation fluctuation amount and the rotation fluctuation amount related to a cylinder subject to the determination of whether the misfire has occurred. The comparison one of the rotation fluctuation amount differs from the rotation fluctuation amount related to the cylinder subject to the deactivating process.

The rotation fluctuation amount is a variable of which the magnitude differs due to factors other than whether a misfire has occurred. The factors include the tolerance of a means used to detect, for example, the rotation speed of the crankshaft, the load on the internal combustion engine, and the crank angle. Rotation fluctuation amounts include a rotation fluctuation amount affected by at least one of these factors in the same manner as the rotation fluctuation amount related to the cylinder subject to determination. Thus, the use of that rotation fluctuation amount as the comparison rotation fluctuation amount prevents situations in which at least one of the factors lowers the accuracy of determining whether a misfire has occurred.

Aspect 8: A misfire detection method for an internal combustion engine is provided. The internal combustion engine includes cylinders. The method includes: a deactivating process that deactivates combustion control for air-fuel mixture in one or some of the cylinders; and a determining process that determines whether a misfire has occurred using a magnitude of a rotation fluctuation amount related to a subject of a determination of whether a misfire has occurred. The determining process determines whether a misfire has occurred by evaluating the magnitude of the rotation fluctuation amount using a determination value independent from the rotation fluctuation amount. The determining process includes a deactivation-related setting process that sets a different determination value for each of a first cylinder and a second cylinder when the deactivating process is executed. The deactivating process has not been executed in the first cylinder and the second cylinder. The rotation fluctuation amount is a change amount of an instantaneous speed variable. The instantaneous speed variable indicates a speed in a case in which a crankshaft rotates in a rotation angle region that is less than or equal to an occurrence interval of a compression top dead center.

In the same manner as the misfire detection device of Aspect 1, this configuration allows for a determination of whether a misfire has occurred while reflecting the difference in the rotation fluctuation amount resulting from the deactivating process. Thus, as compared with the same determination value is set, whether a misfire has occurred is determined with higher accuracy.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment will now be described with reference to the drawings.

Figure 1:
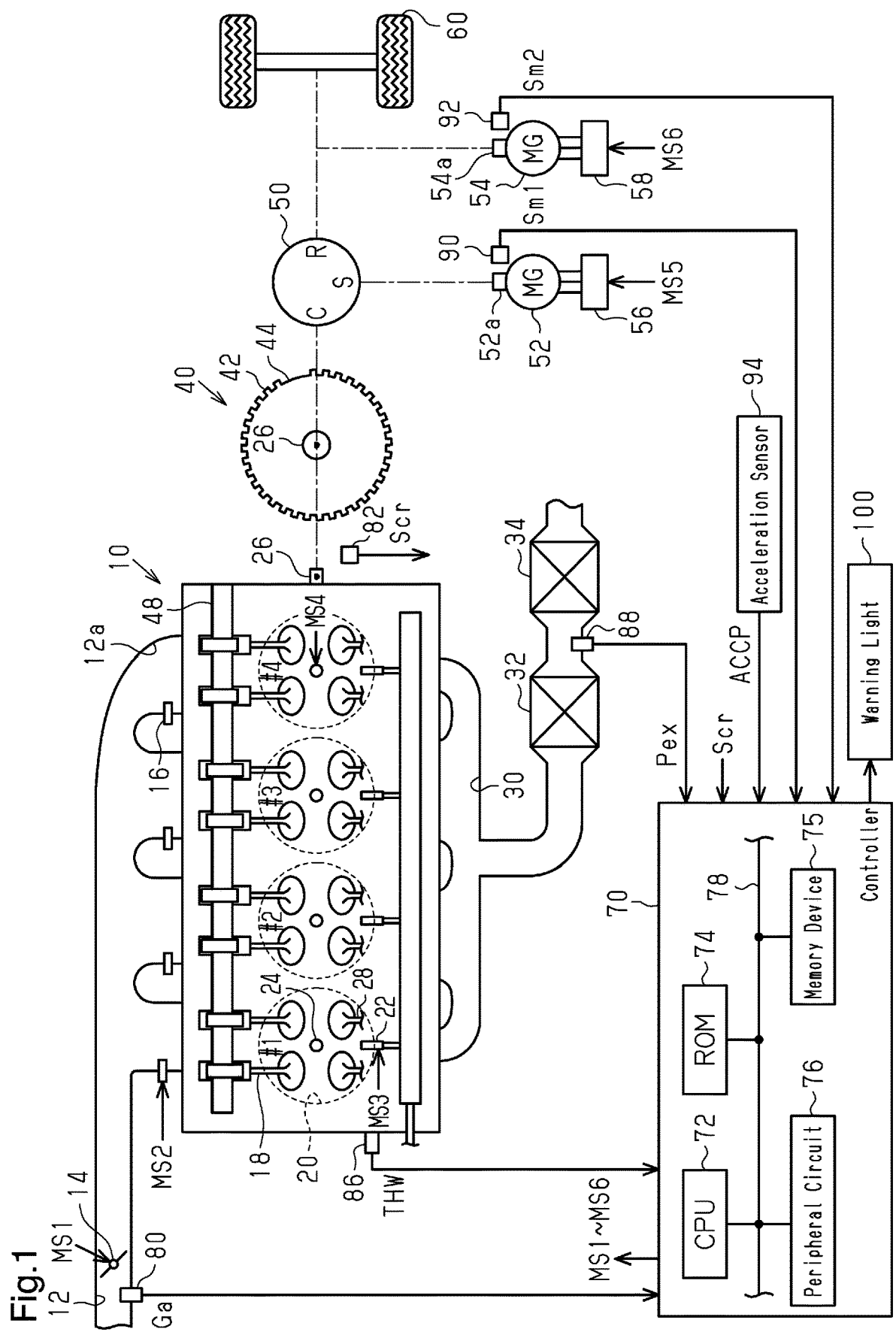
FIG. 1 is a diagram showing the configuration of a driving system and a controller according to a first embodiment.

As shown in FIG. 1, an internal combustion engine 10 includes four cylinders #1 to #4. The internal combustion engine 10 includes an intake passage 12 provided with a throttle valve 14. An intake port 12a at a downstream portion of the intake passage 12 includes port injection valves 16. Each of the port injection valves 16 injects fuel into the intake port 12a. The air drawn into the intake passage 12 and/or the fuel injected from the port injection valves 16 flow into combustion chambers 20 as intake valves 18 open. Fuel is injected into the combustion chambers 20 from direct injection valves 22. The air-fuel mixtures of air and fuel in the combustion chambers 20 are burned by spark discharge of ignition plugs 24. The generated combustion energy is converted into rotation energy of a crankshaft 26.

When exhaust valves 28 open, the air-fuel mixtures burned in the combustion chambers 20 are discharged to an exhaust passage 30 as exhaust gas. The exhaust passage 30 includes a three-way catalyst 32, which has an oxygen storage capacity, and a gasoline particulate filter (GPF) 34. In the GPF 34 of the present embodiment, it is assumed that a three-way catalyst is supported by a filter that traps particulate matter (PM).

A crank rotor 40 with teeth 42 is coupled to the crankshaft 26. The teeth 42 each indicate a rotation angle of the crankshaft 26. While the crank rotor 40 basically includes each tooth 42 at an interval of 10° crank angle (CA), the crank rotor 40 includes an untoothed portion 44. In the untoothed portion 44, the interval between adjacent ones of the teeth 42 is 30° C.A. The untoothed portion 44 indicates the reference rotation angle of the crankshaft 26.

The crankshaft 26 is mechanically coupled to a carrier C of a planetary gear mechanism 50, which includes a power split device. A rotary shaft 52a of a first motor generator 52 is mechanically coupled to a sun gear S of the planetary gear mechanism 50. Further, a rotary shaft 54a of a second motor generator 54 and driven wheels 60 are mechanically coupled to a ring gear R of the planetary gear mechanism 50. An inverter 56 applies alternating-current voltage to a terminal of the first motor generator 52. An inverter 58 applies alternating-current voltage to a terminal of the second motor generator 54.

A controller 70 is configured to control the internal combustion engine 10. The controller 70 is configured to operate operation units of the internal combustion engine 10 such as the throttle valve 14, the port injection valves 16, the direct injection valves 22, and the ignition plugs 24 in order to control controlled variables of the internal combustion engine 10 (for example, torque and exhaust component ratio). Further, the controller 70 is configured to control the first motor generator 52. The controller 70 is configured to control the inverter 56 in order to control a rotation speed that is a controlled variable of the first motor generator 52. Further, the controller 70 is configured to control the second motor generator 54. The controller 70 is configured to control the inverter 58 in order to control torque that is a controlled variable of the second motor generator 54. FIG. 1 shows operation signals MS1 to MS6 that correspond to the throttle valve 14, the port injection valves 16, the direct injection valves 22, the ignition plugs 24, the inverter 56, and the inverter 58, respectively. In order to control the controlled variables of the internal combustion engine 10, the controller 70 refers to an intake air amount Ga detected by an air flow meter 80, an output signal Scr of a crank angle sensor 82, a water temperature THW detected by a water temperature sensor 86, a pressure Pex of exhaust gas flowing into the GPF 34. The pressure Pex is detected by an exhaust pressure sensor 88. Further, in order to control the controlled variables of the first motor generator 52 and the second motor generator 54, the controller 70 refers to an output signal Sm1 of a first rotation angle sensor 90 and an output signal Sm2 of a second rotation angle sensor 92. The output signal Sm1 is used to detect the rotation angle of the first motor generator 52. The output signal Sm2 is used to detect the rotation angle of the second motor generator 54. Furthermore, in order to control the controlled variable of the internal combustion engine 10, the first motor generator 52, and the second motor generator 54, the controller 70 refers to an accelerator operation amount ACCP. The accelerator operation amount ACCP is a depression amount of the accelerator pedal detected by the accelerator sensor 94.

The controller 70 includes a CPU 72 (processor), a ROM 74, a memory device 75, and peripheral circuitry 76. The CPU 72, the ROM 74, the memory device 75, and the peripheral circuitry 76 are capable of communicating with one another via a communication line 78. The peripheral circuitry 76 includes circuits, such as a circuit that generates a clock signal regulating internal operations, a power supply circuit, and a reset circuit. The controller 70 controls the controlled variables by causing the CPU 72 to execute programs stored in the ROM 74. The controller 70 corresponds to a misfire detection device.

Figure 2:
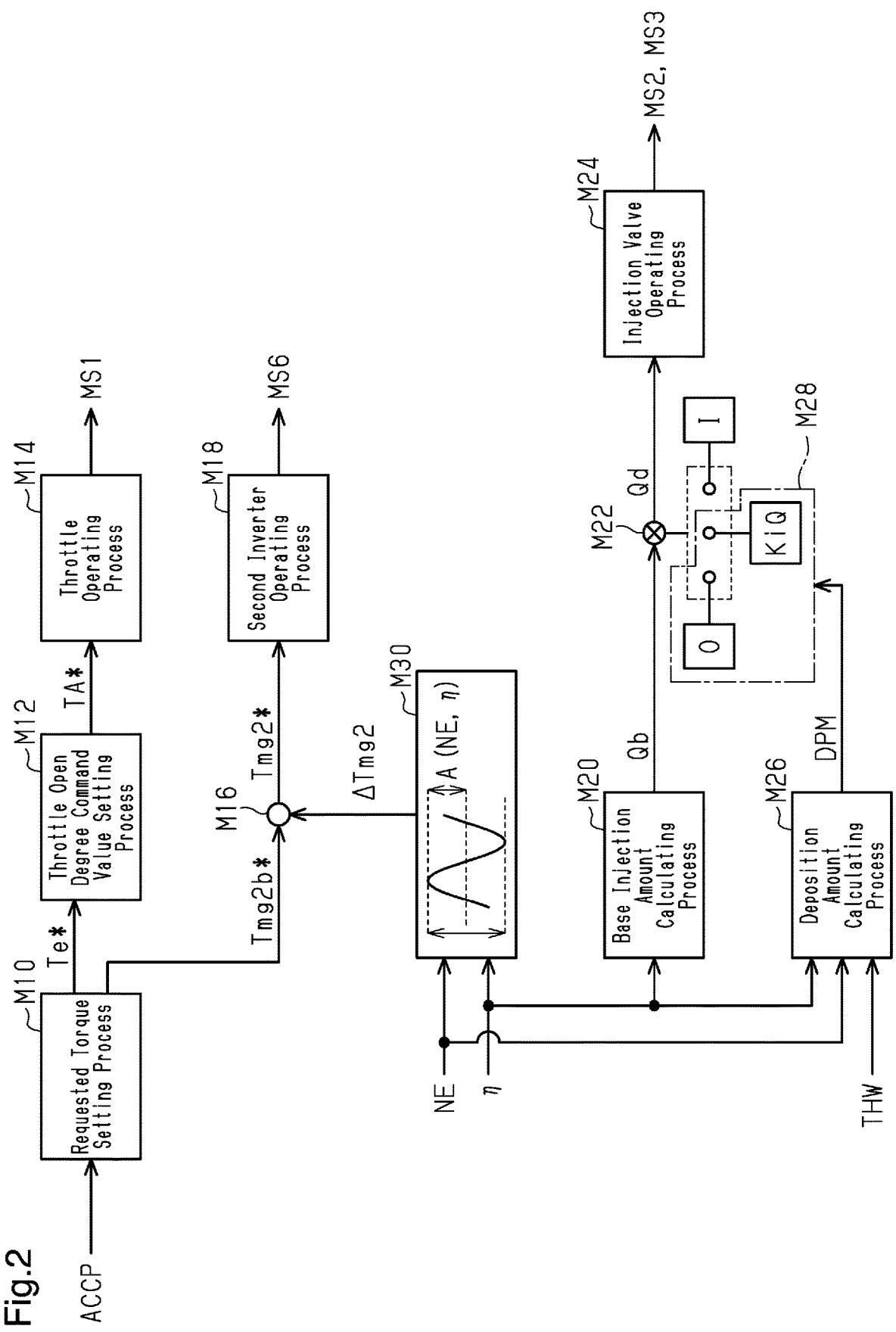
FIG. 2 is a block diagram showing processes executed by the controller of the embodiment.

FIG. 2 shows the processes executed by the controller 70. The processes shown in FIG. 2 are executed by the CPU 72 repeatedly executing programs stored in the ROM 74, for example, in a specific cycle.

A requested torque setting process M10 uses the accelerator operation amount ACCP to calculate an engine requested torque Te* and a second requested torque base value Tmg2b*. The engine requested torque Te* is a requested torque for the internal combustion engine 10. The second requested torque base value Tmg2b* is the base value of a requested torque for the second motor generator 54.

A throttle open degree command value setting process M12 uses the engine requested torque Te* as an input to set a throttle command value TA*. The engine requested torque Te* is a command value of the torque for the internal combustion engine 10. The throttle command value TA* is a command value of the open degree of the throttle valve 14. A throttle operating process M14 uses the throttle command value TA* to output the operation signal MS1 to the throttle valve 14 in order to adjust the open degree of the throttle valve 14.

A correcting process M16 corrects the second requested torque base value Tmg2$b$* to output a second requested torque Tmg2. The amount of correction by the correcting process M16 may be zero.

A second inverter operating process M18 outputs the operation signal MS6 to the inverter 58 in order to operate the inverter 58 such that the torque of the second motor generator 54 is controlled to a value corresponding to the second requested torque Tmg2*.

A base injection amount calculating process M20 uses a charging efficiency $\eta$ to calculate a base injection amount Qb. The charging efficiency $\eta$ is calculated by the CPU 72 in reference to the intake air amount Ga. The base injection amount Qb simply needs to be obtained by, for example, multiplying the charging efficiency $\eta$ by a proportional coefficient such that the air-fuel ratio of air-fuel mixture in the combustion chamber 20 becomes a stoichiometric air-fuel ratio.

A requested injection amount calculating process M22 uses the base injection amount Qb to calculate a requested injection amount Qd. The requested injection amount Qd is a requested value of the amount of fuel injected from the port injection valve 16 and the direct injection valve 22.

An injection valve operating process M24 respectively outputs the operation signals MS2 and MS3 to the port injection valve 16 the direct injection valve 22 in order to operate the port injection valve 16 and the direct injection valve 22 such that the amounts of fuel injected by the port injection valve 16 and the direct injection valve 22 each have a value corresponding to the requested injection amount Qd.

A deposition amount calculating process M26 uses the rotation speed NE, the charging efficiency $\eta$, and the water temperature THW to calculate a deposition amount DPM. The deposition amount DPM is the amount of PM trapped by the GPF 34. This process simply needs to include, for example, a process that uses the rotation speed NE, the charging efficiency $\eta$, and the water temperature THW to calculate the amount of PM in exhaust gas and a process that uses the rotation speed NE, the charging efficiency $\eta$, the temperature of the GPF 34, and the amount of PM in exhaust gas to calculate an update amount of the deposition amount DPM. The temperature of the GPF 34 simply needs to be calculated using, for example, the rotation speed NE and the charging efficiency $\eta$.

A regenerating process M28 burns and removes the PM trapped by the GPF 34. For one or some of cylinders #1 to #4, the regenerating process M28 substitutes 0 into the coefficient multiplied by the base injection amount Qb in the requested injection amount calculating process M22 such that the requested injection amount Qd becomes 0. For the remaining ones of the cylinders #1 to #4, the regenerating process M28 substitutes a value KiQ into the coefficient multiplied by the base injection amount Qb in the requested injection amount calculating process M22 such that the air-fuel ratio of air-fuel mixture becomes richer than the stoichiometric air-fuel ratio. The value KiQ is greater than 1.

The regenerating process M28 is executed when the deposition amount DPM becomes greater than or equal to a specific amount. When the regenerating process M28 is performed to make the deposition amount DPM less than or equal to the specific amount, the regenerating process M28 is ended. In the present embodiment, when the regenerating process M28 is performed once in this manner, the cylinder in which the requested injection amount Qd is set to 0 and combustion control is deactivated is fixed to a specific one of the cylinders. After the regenerating process M28 is completed and the deposition amount DPM becomes greater than or equal to the specific amount again, the combustion-control-deactivated cylinder is changed to a cylinder that differs from the previous one when a new regenerating process M28 is executed. This setting is made for the combustion control to be executed at the same frequency as much as possible between the cylinders.

When the regenerating process M28 is not executed, the correction coefficient of the base injection amount Qb in the requested injection amount calculating process M22 is set to 1.

A compensation torque calculating process M30 calculates a compensation torque $\Delta$Tmg2 when the regenerating process M28 is executed. The compensation torque $\Delta$Tmg2 is generated by the second motor generator 54 in order to compensate for torque fluctuation of which the cycle is a single combustion cycle of the crankshaft 26 of the internal combustion engine 10. The torque fluctuation occurs when the deactivation of fuel control in one or some of the cylinders of the internal combustion engine 10 is caused by the regenerating process M28.

In the present embodiment, the compensation torque $\Delta$Tmg2 is represented as $A \cdot \sin(\theta + \varphi)$ using an amplitude A, a rotation angle $\theta$ in which two rotations of the crankshaft 26 are defined as 360°, and a phase $\varphi$. The CPU 72 calculates the amplitude A using the rotation speed NE and the charging efficiency $\eta$. The rotation speed NE is a variable used to obtain the inertial energy of the crankshaft 26. The rotation fluctuation amount of the crankshaft 26 resulting from the difference in the combustion energy of a compression top dead center cycle is smaller when the inertial energy is large than when the inertial energy is small. The rotation fluctuation amount refers to a fluctuation amount at an instantaneous speed. The instantaneous speed is the rotation speed of the crankshaft 26 at an interval that is less than or equal to an occurrence interval between compression top dead centers. The charging efficiency $\eta$ is a parameter used to obtain the magnitude of the combustion energy in a single cylinder. The combustion energy is larger when the charging efficiency $\eta$ is high than when the charging efficiency $\eta$ is low. This increases the difference in energy in a cylinder in which fuel control is deactivated and a cylinder in which fuel control is continued, and ultimately increases the rotation fluctuation amount.

More specifically, the CPU 72 performs map calculation of the amplitude A in a state in which the ROM 74 stores, in advance, map data including the rotation speed NE and the charging efficiency $\eta$ as input variables and the amplitude A as an output variable.

The map data refers to a data set of discrete values of input variables and discrete values of output variables that respectively correspond to the values of the input variables. When the value of an input variable matches any of the values of the input variables on the map data, the map calculation uses the value of the corresponding output variable on the map data as the calculation result. When the value of the input variable does not match any of the values of the input variables on the map data, the map calculation uses, as the calculation result, a value obtained by interpolation of multiple values of the output variables included in the map data set.

The phase φ is an adaptive element.

Figure 3:
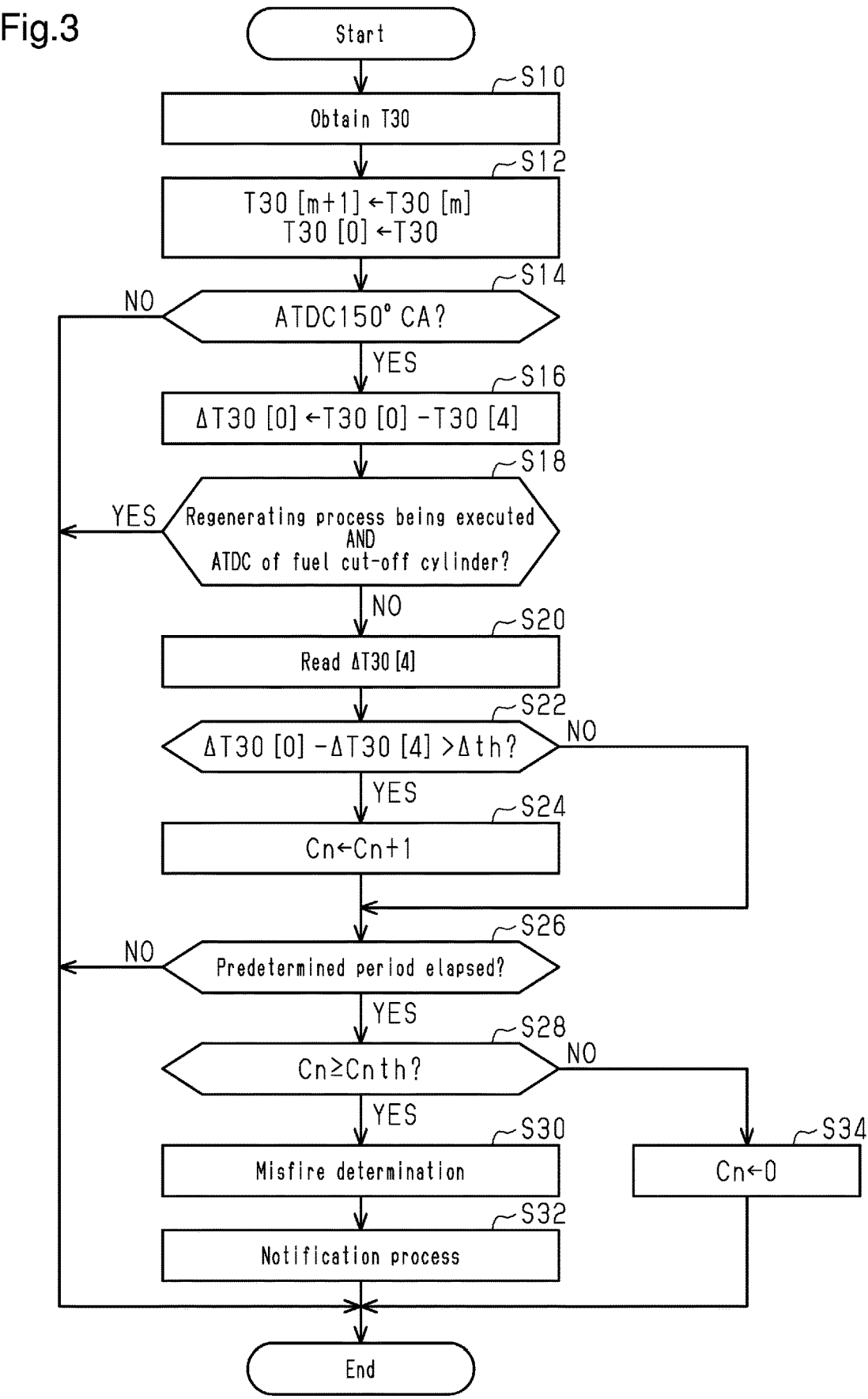
FIG. 3 is a flowchart showing a procedure of processes executed by the controller of the embodiment.

FIG. 3 shows a procedure of other processes executed by the controller 70. The processes shown in FIG. 3 are executed by the CPU 72 repeatedly executing programs stored in the ROM 74, for example, in a cycle of 30° C.A. In the following description, the number of each step is represented by the letter S followed by a numeral.

In the series of processes shown in FIG. 3, the CPU 72 first obtains a time T30 for the crankshaft 26 to rotate by 30° C.A (S10). The time T30 is calculated by the CPU 72 counting the time for the tooth 42 opposing the crank angle sensor 82 to change to the tooth 42 separated from that tooth 42 by 30° C.A. Next, the CPU 72 substitutes the time T30[m] into the time T30[m+1], where m=0, 1, 2, 3, . . . , and substitutes, into the time T30[0], the time T30 that was newly obtained in the process of S10 (S12). This process is performed such that the variable in the parenthesis subsequent to the time T30 becomes larger the further back in time it represents. In a case where the value of the variable in the parenthesis is increased by one, the time T30 is counted at the previous 30° C.A.

Subsequently, the CPU 72 determines whether the current rotation angle of the crankshaft 26 is after top dead center (ATDC) 150° C.A with reference to the top dead center of one of cylinders #1 to #4 (S14). When determining that the current rotation angle of the crankshaft 26 is ATDC150° C.A (S14: YES), the CPU 72 subjects the cylinder to a determination of whether a misfire has occurred, calculates a rotation fluctuation amount ΔT30[0] of the cylinder subject to the determination, and stores it in the memory device 75 (S16). More specifically, the CPU 72 subtracts the time T30[4] from the latest time T30[0]. In this context, T30[4] is the time required for the rotation in a section from the compression top dead center to ATDC30° C.A in the cylinder subject to the determination. Accordingly, in a case where a misfire has not occurred, the time T30[0] is smaller than the time T30[4] and thus the rotation fluctuation amount ΔT30[0] is negative. In a case where a misfire has occurred, the rotation fluctuation amount ΔT30[0] is positive.

As the number in the parenthesis subsequent to the rotation fluctuation amount ΔT30 increases, it indicates a value which is further back in time. That is, for example, the rotation fluctuation amount ΔT30[1] indicates the rotation fluctuation amount ΔT30 in a cylinder where the compression top dead center occurs immediately prior to the current cylinder.

Then, the CPU 72 determines whether the regenerating process is being executed and ATDC150° C.A in the process of S14 is included in an ATDC period of a cylinder where combustion control is deactivated (fuel cut-off cylinder) (S18). When determining that the regenerating process is not being executed or when determining that combustion control is executed in the cylinder subject to the determination though the regenerating process is being executed (S18: NO), the CPU 72 reads the rotation fluctuation amount ΔT30[4] prior to one combustion cycle (S20).

Next, the CPU 72 determines whether the value obtained by subtracting the rotation fluctuation amount ΔT30[4] from the rotation fluctuation amount ΔT30[0] is greater than or equal to a determination value Δth (S22). This process is performed to determine whether a misfire has occurred in the cylinder subject to the determination. That is, in the case where a misfire has not occurred in the current combustion stroke subject to the determination, the current rotation fluctuation amount ΔT30[0] is equivalent to the rotation fluctuation amount ΔT30[4] and thus the value obtained by subtracting the rotation fluctuation amount ΔT30[4] from the rotation fluctuation amount ΔT30[0] is approximately zero. In contrast, in the case where a misfire has occurred in the current combustion stroke subject to the determination, the current rotation fluctuation amount ΔT30[0] is positive and thus the value obtained by subtracting the rotation fluctuation amount ΔT30[4] from the rotation fluctuation amount ΔT30[0] is positive and large. As a premise, a misfire has not occurred in the combustion stroke prior to one combustion cycle corresponding to the rotation fluctuation amount ΔT30[4].

When determining that the value obtained by subtracting the rotation fluctuation amount ΔT30[4] from the rotation fluctuation amount ΔT30[0] is greater than or equal to the determination value Δth (S22: YES), the CPU 72 increments a misfire counter Cn (S24). When completing the process of S24 or making a negative determination in the process of S22, the CPU 72 determines whether a specific period has elapsed from the closer one of the point in time at which the process of S22 was executed for the first time and the latest point in time at which the process of S34 (described later) was executed recently (S26).

When determining that the specific period has elapsed (S26: YES), the CPU 72 determines whether the misfire counter Cn is greater than or equal to a determination value Cnth (S28). When determining that the misfire counter Cn is greater than or equal to the determination value Cnth (S28: YES), the CPU 72 determines that a misfire has occurred (S30). Then, the CPU 72 operates a warning light 100, which is shown in FIG. 1, to issue a notification indicating that a misfire has occurred (S32). The determination that a misfire has occurred indicates that the occurrence frequency of a misfire in the internal combustion engine 10 is greater than or equal to a specific frequency. For example, a case in which a misfire occurs only once during a specific period is not subject to the notification process. That is, the determination that a misfire has occurred indicates that a misfire has occurred at a frequency that needs the execution of the notification process.

When determining that the misfire counter Cn is less than the determination value Cnth (S28: NO), the CPU 72 initializes the misfire counter Cn (S34).

When completing the process of S32 or S34, when making a negative determination in the process of S14 or S26, or when making an affirmative determination in the process of S18, the CPU 72 temporarily ends the series of processes shown in FIG. 3.

Figure 4:
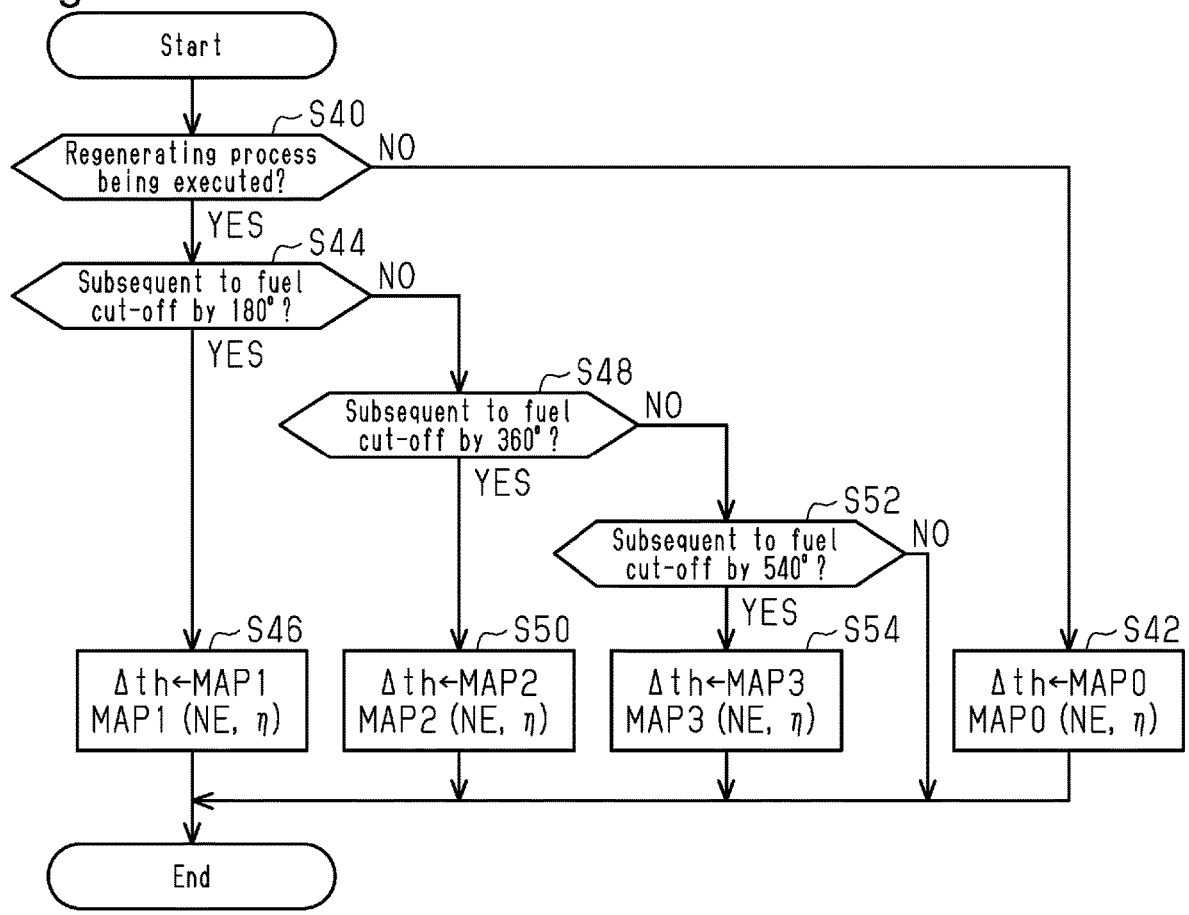
FIG. 4 is a flowchart showing a procedure of processes executed by the controller of the embodiment.

FIG. 4 shows a procedure for processes related to setting the determination value Δth in the present embodiment. The processes shown in FIG. 4 are executed by the CPU 72 repeatedly executing programs stored in the ROM 74, for example, in the occurrence cycle of a compression top dead center.

In the series of processes shown in FIG. 4, the CPU 72 first determines whether the regenerating process is being executed (S40). When determining that the regenerating process is not being executed (S40: NO), the CPU 72 substitutes a reference value MAP0 into the determination value Δth (S42). The reference value MAP0 is obtained by adapting an appropriate value to the determination value Δth during a normal time in which the regenerating process is not executed.

More specifically, the CPU 72 sets the reference value MAP0 to be smaller when the rotation speed NE is high than when the rotation speed NE is low. Further, the CPU 72 sets the reference value MAP0 to be larger when the charging efficiency η is high than when the charging efficiency η is low. For example, this process is executed by the CPU 72 performing map calculation of the reference value MAP0 with the ROM 74 storing, in advance, the rotation speed NE and the charging efficiency η as input variables and the reference value MAP0 as an output variable.

When determining that the regenerating process is being executed (S40: YES), the CPU 72 determines whether the cylinder subject to the determination is a cylinder subsequent, by 180° C.A, to a cylinder where combustion control is deactivated by the regenerating process (S44). The cylinder subsequent to the combustion-control-deactivated cylinder by 180° C.A refers to a cylinder in which the interval from the compression top dead center of the combustion-control-deactivated cylinder is 180° C.A and the point in time when the compression top dead center occurs is subsequent to the point in time when the compression top dead center occurs in the deactivated cylinder. When determining that the cylinder subject to the determination is subsequent by 180° C.A (S44: YES), the CPU 72 substitutes a first threshold value MAP1 into the determination value Δth (S46). The first threshold value MAP1 is obtained by adapting an appropriate value to the determination value Δth in a cylinder of which the compression top dead center occurs subsequent to the combustion-control-deactivated cylinder.

More specifically, the CPU 72 calculates the first threshold value MAP1 in correspondence with the rotation speed NE and the charging efficiency η. For example, this process is executed by the CPU 72 performing map calculation of the first threshold value MAP1 with the ROM 74 storing, in advance, the rotation speed NE and the charging efficiency η as input variables and the first threshold value MAP1 as an output variable. The correlation between the magnitudes of the rotation speed NE and charging efficiency η and the magnitude of the first threshold value MAP1 may be equivalent to the correlation between the magnitudes of the rotation speed NE and charging efficiency η and the magnitude of the reference value MAP0. The equivalent correlation means that the rotation speed NE negatively correlates with the first threshold value MAP1 and the charging efficiency η positively correlates with the first threshold value MAP1.

When determining that the cylinder subject to the determination is not subsequent by 180° C.A (S44: NO), the CPU 72 determines whether the cylinder subject to the determination is subsequent to the combustion-control-deactivated cylinder by 360° C.A (S48). When determining that the cylinder subject to the determination is subsequent by 360° C.A (S48: YES), the CPU 72 substitutes a second threshold value MAP2 into the determination value Δth (S50). The second threshold value MAP2 is obtained by adapting an appropriate value to the determination value Δth in a cylinder of which the compression top dead center occurs subsequent to the combustion-control-deactivated cylinder by 360° C.A.

More specifically, the CPU 72 calculates the second threshold value MAP2 in correspondence with the rotation speed NE and the charging efficiency η. For example, this process is executed by the CPU 72 performing map calculation of the second threshold value MAP2 with the ROM 74 storing, in advance, the rotation speed NE and the charging efficiency η as input variables and the second threshold value MAP2 as an output variable. The correlation between the magnitudes of the rotation speed NE and charging efficiency η and the magnitude of the second threshold value MAP2 may be equivalent to the correlation between the magnitudes of the rotation speed NE and charging efficiency η and the magnitude of the reference value MAP0.

When determining that the cylinder subject to the determination is not subsequent by 360° C.A (S48: NO), the CPU 72 determines whether the cylinder subject to the determination is subsequent to the combustion-control-deactivated cylinder by 540° C.A (S52). When determining that the cylinder subject to the determination is subsequent by 540° C.A (S52: YES), the CPU 72 substitutes a third threshold value MAP3 into the determination value Δth (S54). The third threshold value MAP3 is obtained by adapting an appropriate value to the determination value Δth in a cylinder of which the compression top dead center occurs subsequent to the combustion-control-deactivated cylinder by 540° C.A.

More specifically, the CPU 72 calculates the third threshold value MAP3 in correspondence with the rotation speed NE and the charging efficiency η. For example, this process is executed by the CPU 72 performing map calculation of the third threshold value MAP3 with the ROM 74 storing, in advance, the rotation speed NE and the charging efficiency η as input variables and the third threshold value MAP3 as an output variable. The correlation between the magnitudes of the rotation speed NE and charging efficiency η and the magnitude of the third threshold value MAP3 may be equivalent to the correlation between the magnitudes of the rotation speed NE and charging efficiency η and the magnitude of the reference value MAP0.

When completing the process of S42, S46, S50, or S54, or when making a negative determination in the process of S52, the CPU 72 temporarily ends the series of processes shown in FIG. 4.

The operation and advantages of the present embodiment will now be described.

When the deposition amount DPM becomes greater than or equal to the threshold value DPMth, the CPU 72 executes the regenerating process for the GPF 34. This allows the air drawn in the intake stroke of a specific one of cylinders #1 to #4 to flow out to the exhaust passage 30 in the exhaust stroke of one or some of the cylinders without being burned. The air-fuel mixture of the remaining cylinders is richer than the stoichiometric air-fuel ratio. Thus, the exhaust gas discharged from the remaining cylinders to the exhaust passage 30 contains a vast amount of unburned fuel. The oxygen and unburned fuel discharged to the exhaust passage 30 increase the temperature of the GPF 34 by, for example, being burned in the three-way catalyst 32. The oxygen in the air that has flowed to the exhaust passage 30 oxidizes PM in the GPF 34. This burns and removes the PM.

When determining that the value obtained by subtracting the comparison rotation fluctuation amount ΔT30[4] from the rotation fluctuation amount ΔT30[0] related to the combustion stroke subject to the determination is greater than or equal to the determination value Δth, the CPU 72 increments the misfire counter Cn. When determining that the misfire counter Cn is greater than or equal to the determination value Cnth, the CPU 72 determines that a misfire has occurred and issues a notification indicating the occurrence of the misfire.

When executing the regenerating process, the CPU 72 sets the determination value Δth to be different from that obtained when the regenerating process is not executed. Thus, even when the deactivation of combustion control results in a rotation behavior of the crankshaft 26 that differs from the rotation behavior obtained when the regenerating process is not executed, the determination of whether a misfire has occurred is made accurately.

The above-described present embodiment further provides the following operation and advantages.

(1) When the regenerating process is executed, the determination values Δth of combustion-control-executed cylinders are set to be independent from each other. Thus, even when the rotation behavior of the crankshaft 26 differs depending on whether the occurrence interval from the compression top dead center of a cylinder subject to deactivation of combustion control is large or small, an appropriate determination value Δth is set to determine whether a misfire has occurred.

(2) The determination value Δth is variably set using the charging efficiency η, which is a variable indicating load, and the rotation speed NE. The inertial energy is larger when the rotation speed NE is high than when the rotation speed NE is low. This limits an increase in the rotation fluctuation of the crankshaft 26 despite the fluctuation in torque. The combustion energy in each cylinder is larger when the load is high than when the load is low. This increases the torque variation caused by deactivating combustion control. Thus, the charging efficiency η and the rotation speed NE are variables that correlate with the magnitude of the rotation fluctuation amount ΔT30. Accordingly, in the present embodiment, setting the determination value Δth in correspondence with the rotation speed NE and the charging efficiency η allows the determination accuracy to be higher than setting the determination value Δth without using the rotation speed NE and the charging efficiency η.

(3) When executing the regenerating process, the CPU 72 superimposes the compensation torque ΔTmg2 on the torque of the second motor generator 54. In this case, the rotation behavior of the crankshaft 26 is affected by the deactivating process for combustion control and by the compensation torque ΔTmg2. Thus, as compared with when the rotation behavior of the crankshaft 26 is unaffected by the compensation torque ΔTmg2, the rotation behavior of the crankshaft 26 is determined by more complicated factors. Accordingly, setting the determination value Δth common to combustion-control-executed cylinders tends to become difficult. Thus, it is particularly effective to set a different determination value Δth in correspondence with the difference in angular interval between the compression top dead center of the cylinder subject to the determination of misfire and the compression top dead center of the combustion-control-deactivated cylinder.

(4) Whether a misfire has occurred is determined by comparing the determination value Δth with the magnitude of the rotation fluctuation amount ΔT30[0] relative to the comparison rotation fluctuation amount ΔT30[4], instead of directly comparing a determination value with the rotation fluctuation amount ΔT30[0] related to a cylinder subject to the determination of whether a misfire has occurred. The rotation fluctuation amount ΔT30[0] is affected by the tolerance between the intervals of the teeth 42 of the crank rotor 40. However, the rotation fluctuation amount ΔT30[0] and the rotation fluctuation amount ΔT30[4] are calculated from the same tooth 42. Thus, the tolerance affects these two amounts in the same manner. Accordingly, the use of these two relative magnitudes prevents the tolerance from adversely affecting the accuracy of determining whether a misfire has occurred.

Second Embodiment

A second embodiment will now be described with reference to the drawings, focusing on the differences from the first embodiment.

Figure 5:
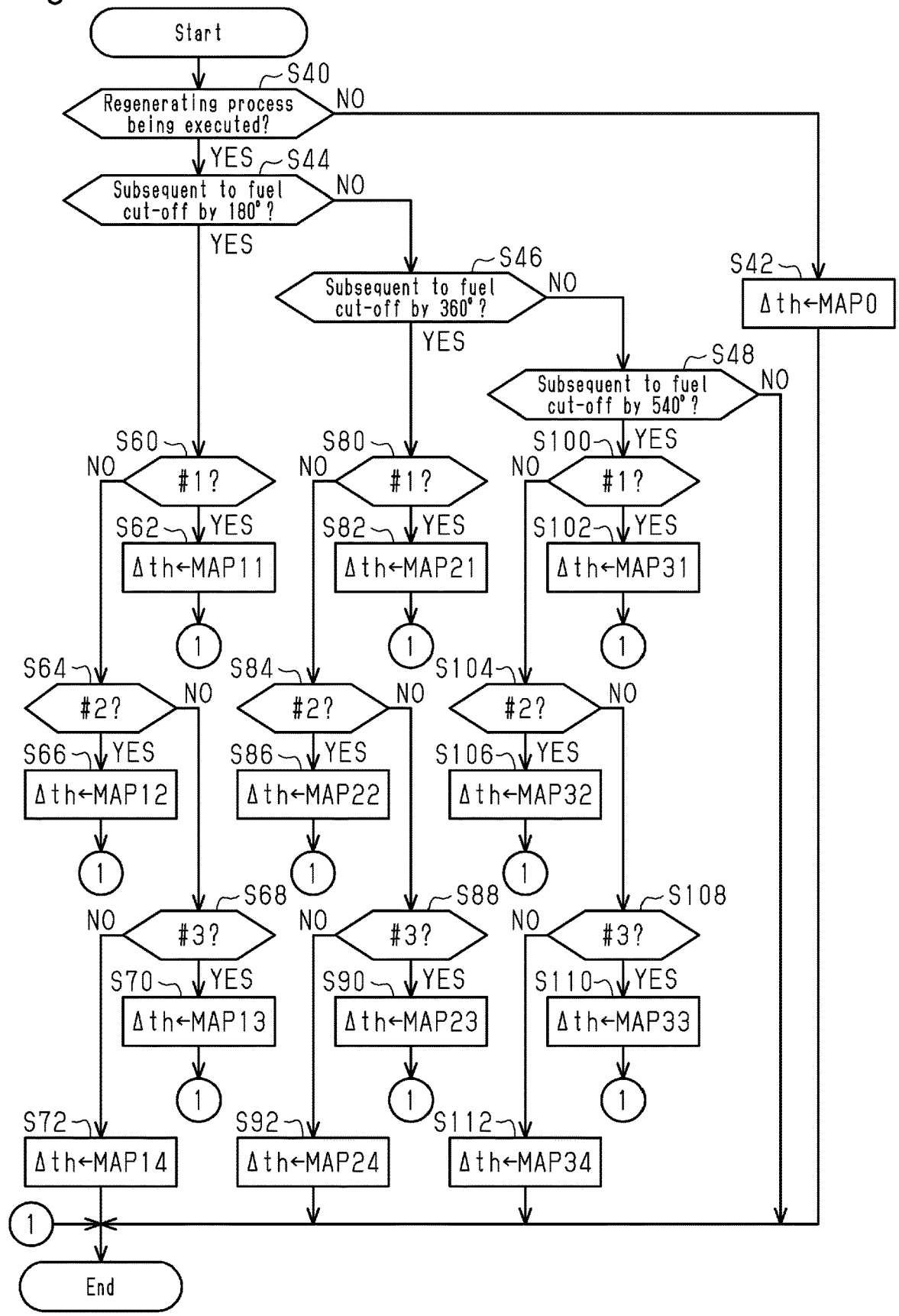
FIG. 5 is a flowchart showing a procedure for processes executed by the controller according to a second embodiment.

FIG. 5 shows a procedure for processes related to setting the determination value Δth in the present embodiment. The processes shown in FIG. 5 are executed by the CPU 72 repeatedly executing programs stored in the ROM 74, for example, in the occurrence cycle of a compression top dead center. In FIG. 5, the same step numbers are given to the processes that correspond to those in FIG. 4.

In the series of processes shown in FIG. 5, when making an affirmative determination in the process of S44, the CPU 72 determines in the processes of S60, S64, S68 whether the cylinder subsequent to the combustion-control-deactivated cylinder by 180° C.A is any one of cylinders #1 to #4. When the cylinder subsequent to the combustion-control-deactivated cylinder by 180° C.A is cylinder #1 (S60: YES), the CPU 72 substitutes a first-cylinder first threshold value MAP11 into the determination value Δth (S62). When the cylinder is cylinder #2 (S64: YES), the CPU 72 substitutes a second-cylinder first threshold value MAP12 into the determination value Δth (S66). When the cylinder is cylinder #3 (S68: YES), the CPU 72 substitutes a third-cylinder first threshold value MAP13 into the determination value Δth (S70). When the cylinder is cylinder #4 (S68: NO), the CPU 72 substitutes a fourth-cylinder first threshold value MAP14 into the determination value Δth (S72).

Each of the first-cylinder first threshold value MAP11, the second-cylinder first threshold value MAP12, the third-cylinder first threshold value MAP13, and the fourth-cylinder first threshold value MAP14 is obtained through map calculation using the corresponding map data. In the same manner as the above-described map data, this map data includes the rotation speed NE and charging efficiency η as input variables and is stored in the ROM 74. The rotation speed NE may negatively correlate with each threshold value and the charging efficiency may positively correlate with each threshold value.

Likewise, when making an affirmative determination in the process of S46, the CPU 72 determines in the processes of S80, S84, S88 whether the cylinder subsequent to the combustion-control-deactivated cylinder by 360° C.A is any one of cylinders #1 to #4. When the cylinder subsequent to the combustion-control-deactivated cylinder by 360° C.A is cylinder #1 (S80: YES), the CPU 72 substitutes a first-cylinder second threshold value MAP21 into the determination value Δth (S82). When the cylinder is cylinder #2 (S84: YES), the CPU 72 substitutes a second-cylinder second threshold value MAP22 into the determination value Δth (S86). When the cylinder is cylinder #3 (S88: YES), the CPU 72 substitutes a third-cylinder second threshold value MAP23 into the determination value Δth (S90). When the cylinder is cylinder #4 (S88: NO), the CPU 72 substitutes a fourth-cylinder second threshold value MAP24 into the determination value Δth (S92).

Each of the first-cylinder second threshold value MAP21, the second-cylinder second threshold value MAP22, the third-cylinder second threshold value MAP23, and the fourth-cylinder second threshold value MAP24 is obtained through map calculation using the corresponding map data. In the same manner as the above-described map data, this map data includes the rotation speed NE and charging efficiency η as input variables and is stored in the ROM 74. The rotation speed NE may negatively correlate with each threshold value and the charging efficiency η may positively correlate with each threshold value.

Likewise, when making an affirmative determination in the process of S48, the CPU 72 determines in the processes of S100, S104, S108 whether the cylinder subsequent to the combustion-control-deactivated cylinder by 540° C.A is any one of cylinders #1 to #4. When the cylinder subsequent to the combustion-control-deactivated cylinder by 540° C.A is cylinder #1 (S100: YES), the CPU 72 substitutes a first-cylinder third threshold value MAP31 into the determination value Δth (S102). When the cylinder is cylinder #2 (S104: YES), the CPU 72 substitutes a second-cylinder third threshold value MAP32 into the determination value Δth (S106). When the cylinder is cylinder #3 (S108: YES), the CPU 72 substitutes a third-cylinder third threshold value MAP33 into the determination value Δth (S110). When the cylinder is cylinder #4 (S108: NO), the CPU 72 substitutes a fourth-cylinder third threshold value MAP34 into the determination value Δth (S112).

Each of the first-cylinder third threshold value MAP31, the second-cylinder third threshold value MAP32, the third-cylinder third threshold value MAP33, and the fourth-cylinder third threshold value MAP34 is obtained through map calculation using the corresponding map data. In the same manner as the above-described map data, this map data includes the rotation speed NE and charging efficiency η as input variables and is stored in the ROM 74. The rotation speed NE may negatively correlate with each threshold value and the charging efficiency η may positively correlate with each threshold value.

When completing the process of S42, S62, S66, S70, S72, S82, S86, S90, S92, 5102, S106, S110, or S112 or when making a negative determination in the process of S48, the CPU 72 temporarily ends the series of processes shown in FIG. 5.

Thus, in the present embodiment, the determination values Δth are set independently from each other depending on which one of cylinders #1 to #4 is used even if the angular interval between the compression top dead center of that cylinder is identical to the compression top dead center of the combustion-control-deactivated cylinder. Accordingly, when the angular interval between the compression top dead centers is identical but a different cylinder is used, an appropriate determination value Δth is set for determining whether a misfire has occurred even in a case where the rotation fluctuation amount without the occurrence of a misfire is different due to, for example, the difference in a geometric arrangement of cylinders.

Particularly, in the present embodiment, the rotation behavior of the crankshaft 26 is affected by the deactivating process for combustion control and by the compensation torque ΔTmg2. Thus, as compared with when the rotation behavior of the crankshaft 26 is unaffected by the compensation torque ΔTmg2, the rotation behavior of the crankshaft 26 is determined by more complicated factors. Accordingly, setting the determination value Δth common to combustion-control-executed cylinders tends to become difficult. Thus, it is particularly effective to set a different determination value Δth in correspondence with the difference in cylinder in addition to the difference in angular interval between the compression top dead center of the cylinder subject to the determination of misfire and the compression top dead center of the combustion-control-deactivated cylinder.

Correspondence

The correspondence between the items in the above-described embodiments and the items described in the above-described SUMMARY is as follows. In the following description, the correspondence is shown for each of the numbers described in the SUMMARY.

[Aspect 1] The deactivating process corresponds to the regenerating process M28. The determining process corresponds to the processes of S22 to S30, and S34. The deactivation-related setting process corresponds to the processes of S44 to S54 in FIG. 4 and the processes of S44 to S48 and S60 to S112 in FIG. 5. The rotation fluctuation amount corresponds to the rotation fluctuation amount ΔT30. The instantaneous speed variable corresponds to the time T30.

[Aspect 2] The first cylinder corresponds to a cylinder used when an affirmative determination is made in the process of S44. The second cylinder corresponds to a cylinder used when a positive determination is made in the process of S46 in FIG. 5.

[Aspect 3] The determination value obtained when the deactivating process is not executed corresponds to the determination value Δth obtained when the process of S42 is executed.

[Aspect 4] The variable indicating load corresponds to the charging efficiency η.

[Aspect 5] The entire description of Aspect 5 corresponds to the processes of the flowchart in FIG. 5.

[Aspect 6] The electric motor corresponds to the second motor generator 54. The compensation torque operating process corresponds to the second inverter operating process M18 performed when the compensation torque ΔTmg2 is superimposed on the second requested torque Tmg2*.

[Aspect 7] The comparison rotation fluctuation amount corresponds to the rotation fluctuation amount ΔT30[4].

Modifications

The present embodiment may be modified as follows. The above-described embodiment and the following modifications can be combined as long as the combined modifications remain technically consistent with each other.

Modification Related to Instantaneous Speed Variable

In the above-described embodiments, the crank angle region that defines the instantaneous speed variable, which indicates the rotation speed of the crankshaft 26 in the crank angle region that is less than or equal to the interval between compression top dead centers, is 30° C.A. Instead, for example, the crank angle region may be 10° C.A or may be the interval between compression top dead centers.

The instantaneous speed variable is not limited to an amount having the dimension of time and may be, for example, an amount having the dimension of speed.

Modification Related to Rotation Fluctuation Amount

In the above-described embodiments, the rotation fluctuation amount ΔT30 is the difference between the instantaneous speed variables separated from each other by 120° C.A. Instead, for example, the rotation fluctuation amount ΔT30 may be the difference between the instantaneous speed variables separated from each other by 90° C.A.

The rotation fluctuation amount is not limited to the difference between the instantaneous speed variables and may be the ratio of the instantaneous speed variables.

Modification Related to Deactivation-Related Setting Process

In the processes of FIGS. 4 and 5, when the regenerating process is executed, a different determination value Δth is set for each of cylinders other than the combustion-control-deactivated cylinder, independently from the determination value Δth in a case where the regenerating process is not executed. Instead, for example, when an affirmative determination is made in the process of S52, the process may proceed to the process of S42 so as to set the determination value Δth to the reference value MAP0. Alternatively, for example, when an affirmative determination is made in the process of any one of S48 and S52, the process may proceed to the process of S42 so as to set the determination value Δth to the reference value MAP0.

For example, when the number of cylinders in the internal combustion engine is six or eight as described in the Modification Related to Internal Combustion Engine below, a different determination value Δth may be set for each of the five or seven cylinders other than the combustion-control-deactivated cylinder using the corresponding map data or the like in the processes of FIGS. 4 and 5. Instead of each of the cylinders including the corresponding map data or the like, the determination value Δth may be set to the reference value MAP0 in one or some of the cylinders. More specifically, a determination value Δth set independently from the reference value MAP0 may be used only for two cylinders, namely, a cylinder of which compression top dead center occurs subsequent to the compression top dead center of a combustion-control-deactivated cylinder and a cylinder of which compression top dead center occurs immediately afterwards. In the case of setting a different determination value Δth dedicated for the regenerating process only for one or some of the cylinders, the compression top dead center of the cylinder subject to this setting does not necessarily have to be close to the compression top dead center of the combustion-control-deactivated cylinder. For example, the determination value Δth may be set to the reference value MAP0 for the cylinder of which compression top dead center occurs subsequent to the cylinder subject to deactivation of combustion control, and the determination value Δth may be set independently from the reference value MAP0 only for a cylinder having a larger interval between the compression top dead centers of cylinders subject to deactivation of combustion control. This is effective when the compensation torque ΔTmg2 affects the compression top dead center of the cylinder subject to deactivation of combustion control so as to be separated from the compression top dead center of a cylinder in which the accuracy of determination may be decreased.

Modification Related to Comparison Rotation Fluctuation Amount

In the above-described embodiments, the rotation fluctuation amount compared with the rotation fluctuation amount ΔT30[0] related to a cylinder subject to determination is set to the rotation fluctuation amount ΔT30[4], which is retarded by 720° C.A. Instead, the rotation fluctuation amount ΔT30 separated by an angular interval that is an integral multiple of 360° C.A may be used. This prevents the tolerance or the like from affecting the determination accuracy. To determine whether there is an anomaly in which a misfire occurs frequently in a specific one of the cylinders, it is desired that the comparison rotation fluctuation amount be set to the rotation fluctuation amount ΔT30 separated by an angular interval that is an integral multiple of 360° C.A, not an integral multiple of 720° C.A. In this case, it is desired that the setting be made so as to prevent the rotation fluctuation amount ΔT30 from being affected by the instantaneous speed variable of a cylinder subject to deactivation of combustion control. For example, this is achieved by selecting, as the comparison rotation fluctuation amount, a rotation fluctuation amount that prevents the influence of the cylinder subject to deactivation of combustion control when frequently changing the cylinder as described in Modification Related to Regenerating Process below. To prevent the influence of the cylinder subject to deactivation of combustion control, the selected rotation fluctuation amount simply needs to be calculated without using a value of the instantaneous speed variable in the angular interval from the compression top dead center of the cylinder to the next compression top dead center.

Modification Related to Determining Process

The relative magnitude of the comparison rotation fluctuation amount and the rotation fluctuation amount related to a cylinder subject to a determination of whether a misfire has occurred does not have to be quantified using the difference between the comparison rotation fluctuation amount and the rotation fluctuation amount related to the cylinder subject to the determination of whether the misfire has occurred. Instead, the quantification may be performed using, for example, a ratio. In this case, whether a misfire has occurred simply needs to be determined by comparing the determination value with the ratio of the comparison rotation fluctuation amount and the rotation fluctuation amount related to the cylinder subject to the determination of whether the misfire has occurred.

The determining process is not limited to the process that determines whether a misfire has occurred by comparing the determination value with the relative magnitude of the comparison rotation fluctuation amount and the rotation fluctuation amount related to the cylinder subject to a determination of whether a misfire has occurred. For example, the determining process may determine whether a misfire has occurred by comparing the determination value with the rotation fluctuation amount related to the cylinder subject to the determination of whether the misfire has occurred.

Modification Related to Regenerating Process

In the above-described embodiments, the combustion-control-deactivated cylinder is fixed during a single regenerating process. Instead, for example, when the number of cylinders in the internal combustion engine is four as described above, combustion control may be deactivated once in five strokes. Such setting adjusts the deactivation interval of combustion control. This restricts, for example, situations in which the resonant frequency of the driving system matches the frequency corresponding to the deactivation interval of combustion control.

Modification Related to Deactivating Process

The deactivating process is not limited to the regenerating process. For example, the deactivating process may deactivate the supply of fuel in one or some of the cylinders in order to adjust the output of the internal combustion engine 10. Instead, when an anomaly occurs in one or some of the cylinders, a process may be performed to deactivate combustion control in the cylinder. Alternatively, when the oxygen absorption amount of the three-way catalyst 32 is less than or equal to a given value, a process may be performed to deactivate combustion control only in one or some of the cylinders and execute control that sets the air-fuel ratio of air-fuel mixture in the remaining cylinders to the stoichiometric air-fuel ratio.

Modification Related to Reflection of Misfire Determination Result

In the above-described embodiments, when a misfire has been determined as having occurred, the notification process using the warning light 100 is executed. The notification process is not limited to the process in which a device that outputs visual information is subject to operation. Instead, the notification process may be, for example, a process in which a device that outputs auditory information is subject to operation.

The misfire determination result does not necessarily have to be used for the notification process. For example, when a misfire occurs, a process may be executed to operate the operation units of the internal combustion engine 10 such that the control of the internal combustion engine 10 is changed to an operating state in which a misfire does not easily occur. In short, the misfire determination result may be reflected through a process that handles a misfire by operating a specific hardware means.

Modification Related to Estimation of Deposition Amount

The process that estimates the deposition amount DPM is not limited to the one illustrated in FIG. 2. Instead, for example, the deposition amount DPM may be estimated using the intake air amount Ga and the pressure difference between the upstream side and the downstream side of the GPF 34. More specifically, the deposition amount DPM simply needs to be estimated to be a larger value when the pressure difference is large than when the pressure difference is small. Even when the pressure difference is the same, the deposition amount DPM simply needs to be estimated to be a larger value when the intake air amount Ga is small than when the intake air amount Ga is large. If the pressure in the downstream side of the GPF 34 is regarded as a fixed value, the pressure Pex may be used instead of the pressure difference.

Modification Related to Aftertreatment Device

The GPF 34 is not limited to the filter supported by the three-way catalyst and may be only the filter. Further, the GPF 34 does not have to be located on the downstream side of the three-way catalyst 32 in the exhaust passage 30. Furthermore, the aftertreatment device does not necessarily have to include the GPF 34. For example, when the aftertreatment device includes only the three-way catalyst 32, the execution of the processes illustrated in the above-described embodiments and the modifications is effective in a case where the aftertreatment device needs to be heated during the regenerating process.

Modification Related to Controller 70

The controller 70 is not limited to a device that includes the CPU 72 and the ROM 74 and executes software processing. For example, at least part of the processes executed by the software in the above-described embodiments may be executed by hardware circuits dedicated to executing these processes (such as ASIC). That is, the controller 70 may be modified as long as it has any one of the following configurations (a) to (c): (a) a configuration including a processor that executes all of the above-described processes according to programs and a program storage device such as a ROM that stores the programs; (b) a configuration including a processor and a program storage device that execute part of the above-described processes according to the programs and a dedicated hardware circuit that executes the remaining processes; and (c) a configuration including a dedicated hardware circuit that executes all of the above-described processes. A plurality of software execution devices each including a processor and a program storage device and a plurality of dedicated hardware circuits may be provided.

Modification Related to Internal Combustion Engine 10

The number of cylinders in the internal combustion engine 10 is not limited to four and may be, for example, six or eight.

The internal combustion engine 10 does not necessarily have to include the port injection valve 16 and the direct injection valve 22.

The internal combustion engine 10 is not limited to a spark-ignition engine such as a gasoline engine. For example, the internal combustion engine 10 may be a compression ignition internal combustion engine that uses light oil as fuel.

Modification Related to Vehicle

The vehicle is not limited to a series-parallel hybrid vehicle and may be, for example, a parallel hybrid vehicle or a series-parallel hybrid vehicle. The hybrid vehicle may be replaced with, for example, a vehicle in which only the internal combustion engine 10 is used as a power generation device for the vehicle.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A misfire detection device for an internal combustion engine, the internal combustion engine including cylinders, wherein the misfire detection device is configured to execute:
  a deactivating process that deactivates combustion control for air-fuel mixture in one or some of the cylinders; and
  a determining process that determines whether a misfire has occurred using a magnitude of a rotation fluctuation amount related to a subject of a determination of whether a misfire has occurred, the determining process determines whether a misfire has occurred by evaluating the magnitude of the rotation fluctuation amount using a determination value independent from the rotation fluctuation amount, the determining process includes a deactivation-related setting process that sets a different determination value for each of a first cylinder and a second cylinder when the deactivating process is executed, wherein the deactivating process has not been executed in the first cylinder and the second cylinder, the rotation fluctuation amount is a change amount of an instantaneous speed variable, and the instantaneous speed variable indicates a speed in a case in which a crankshaft rotates in a rotation angle region that is less than or equal to an occurrence interval of a compression top dead center.

2. The misfire detection device according to claim 1, wherein a compression top dead center of the first cylinder occurs subsequent to a compression top dead center of a cylinder subject to the deactivating process, and a compression top dead center of the second cylinder occurs subsequent to the compression top dead center of the first cylinder.

3. The misfire detection device according to claim 1, wherein the deactivation-related setting process includes setting a determination value of the first cylinder and a determination value of the second cylinder to be independent from a determination value in a case in which the deactivating process is not executed.

4. The misfire detection device according to claim 1, wherein the deactivation-related setting process includes a process that variably sets the determination value using at least one of a load variable or a rotation speed of the crankshaft, the load variable indicating load on the internal combustion engine.

5. The misfire detection device according to claim 1, wherein the deactivating process includes changing a cylinder subject to deactivation of the combustion control, and the deactivation-related setting process includes:

a process that sets the determination value to a different value depending on an angular interval between a compression top dead center of a cylinder subject to the determination of misfire and a compression top dead center of a cylinder subject to the deactivating process; and a process that sets the determination value to a different value when the cylinder subject to the determination of misfire is different, even if the angular interval between the compression top dead center of the cylinder subject to the determination of misfire and the compression top dead center of the cylinder subject to the deactivating process is identical.

6. The misfire detection device according to claim 1, wherein torque of an electric motor is transmissible to the crankshaft, and the misfire detection device is configured to execute a compensation torque operating process that adjusts the torque of the electric motor using a torque command value as an input, a compensation torque being superimposed on the torque command value, the compensation torque compensating for insufficiency of torque in a specific period subsequent to a compression top dead center of the one or some of the cylinders.

7. The misfire detection device according to claim 1, wherein the determining process includes a process that determines whether a misfire has occurred by comparing the determination value with a relative magnitude of a comparison one of the rotation fluctuation amount and the rotation fluctuation amount related to a cylinder subject to the determination of whether the misfire has occurred, and the comparison one of the rotation fluctuation amount differs from the rotation fluctuation amount related to the cylinder subject to the deactivating process.

8. A misfire detection method for an internal combustion engine, the internal combustion engine including cylinders, the method comprising:

a deactivating process that deactivates combustion control for air-fuel mixture in one or some of the cylinders; and a determining process that determines whether a misfire has occurred using a magnitude of a rotation fluctuation amount related to a subject of a determination of whether a misfire has occurred, wherein the determining process determines whether a misfire has occurred by evaluating the magnitude of the rotation fluctuation amount using a determination value independent from the rotation fluctuation amount, the determining process includes a deactivation-related setting process that sets a different determination value for each of a first cylinder and a second cylinder when the deactivating process is executed, wherein the deactivating process has not been executed in the first cylinder and the second cylinder, the rotation fluctuation amount is a change amount of an instantaneous speed variable, and the instantaneous speed variable indicates a speed in a case in which a crankshaft rotates in a rotation angle region that is less than or equal to an occurrence interval of a compression top dead center.

* * * * *